US011866044B2

(12) United States Patent
Hunt

(10) Patent No.: US 11,866,044 B2
(45) Date of Patent: Jan. 9, 2024

(54) SYSTEMS AND METHODS TO SYNCHRONIZE SYSTEMS OF A VEHICLE

(71) Applicants: Denso International America, Inc., Southfield, MI (US); Denso Corporation, Aichi (JP)

(72) Inventor: Shawn Hunt, Bethel Park, PA (US)

(73) Assignees: Denso International America, Inc., Southfield, MI (US); Denso Corporation, Kariya (JP)

(*) Notice: Subject to any disclaimer, the term of this patent is extended or adjusted under 35 U.S.C. 154(b) by 283 days.

(21) Appl. No.: 17/210,780

(22) Filed: Mar. 24, 2021

(65) Prior Publication Data

US 2022/0306109 A1    Sep. 29, 2022

(51) Int. Cl.
*G06V 20/56*    (2022.01)
*B60W 30/18*    (2012.01)
*H04L 12/40*    (2006.01)
*H04W 84/18*    (2009.01)

(52) U.S. Cl.
CPC ....... *B60W 30/18109* (2013.01); *G06V 20/56* (2022.01); *H04L 12/40* (2013.01); *H04W 84/18* (2013.01); *B60W 2420/403* (2013.01); *H04L 2012/40215* (2013.01); *H04L 2012/40273* (2013.01)

(58) Field of Classification Search
CPC ..... B60W 30/18109; B60W 2420/403; B60W 2050/0215; G06V 20/05
See application file for complete search history.

(56) References Cited

U.S. PATENT DOCUMENTS

| 10,332,089 | B1 | 6/2019 | Asmi et al. | |
| 2018/0088584 | A1* | 3/2018 | Tascione | G05D 1/0276 |
| 2019/0120948 | A1* | 4/2019 | Yang | G06T 7/80 |
| 2020/0174130 | A1* | 6/2020 | Banerjee | G06T 7/13 |
| 2021/0024096 | A1 | 1/2021 | Wang et al. | |
| 2022/0283298 | A1* | 9/2022 | Di | G06V 20/56 |

FOREIGN PATENT DOCUMENTS

CN          107153454 A    9/2017
WO    WO-2016207934 A1 *  12/2016

OTHER PUBLICATIONS

Translation of WO 2016207934 A1 to Miyako (Year: 2016).*

(Continued)

*Primary Examiner* — Kenneth J Malkowski
(74) *Attorney, Agent, or Firm* — Christopher G. Darrow; Darrow Mustafa PC

(57) ABSTRACT

System, methods, and other embodiments described herein relate to improving the synchronizing of systems in a vehicle without relying on external controls or hardware. In one embodiment, a method includes detecting a stop of a vehicle according to data acquired from two or more sensors. The method also includes identifying motion from the stop according to the data and corresponding timestamps from the two or more sensors, wherein the data and the corresponding timestamps are internal to the two or more sensors. The method also includes synchronizing the two or more sensors according to the corresponding timestamps. The method also includes controlling the motion of the vehicle using the two or more sensors.

20 Claims, 5 Drawing Sheets

(56) References Cited

OTHER PUBLICATIONS

Tschopp et al., "VersaVIS—An Open Versatile Multi-Camera Visual-Inertial Sensor Suite," Sensors 2020, vol. 20, issue 5, pp. 1439-1447.
Fridman et al., "Automated Synchronization of Driving Data Using Vibration and Steering Events," Pattern Recognition Letters, vol. 75, pp. 9-15, May 2016.
Edwin Olson, "A Passive Solution to the Sensor Synchronization Problem," 2010 IEEE/RSJ International Conference on Intelligent Robots and Systems, Taipei, Taiwan, 2010, pp. 1059-1064.
Nikolic et al., "A Synchronized Visual-Inertial Sensor System with FPGA Pre-Processing for Accurate Real-Time SLAM," 2014 IEEE International Conference on Robotics and Automation (ICRA), Hong Kong, China, 2014, pp. 431-437.

* cited by examiner

SYSTEMS AND METHODS TO SYNCHRONIZE SYSTEMS OF A VEHICLE

TECHNICAL FIELD

The subject matter described herein relates in general to systems and methods that synchronize systems of a vehicle, and, more particularly, to synchronize sensors in a vehicle without relying on an external control.

BACKGROUND

A vehicle may synchronize systems for safety and control operations. For example, an automated vehicle may synchronize sensors to operate with more reliable data and avoid reliance on stale data. In this case, safety can be impacted when a system uses stale camera, global positioning, or other data for perception or motion control in automated mode. However, a system may have difficulties to synchronize systems or sensors associated with computing devices from different manufacturers in the vehicle. For instance, synchronizing these different computing devices may be difficult due to compatibility and propriety signaling issues of components.

In various implementations, a system may use external hardware as a synchronization master in a vehicle. The external hardware may receive a signal from each computing device as a triggering event to start synchronizing. In one approach, the signal may be a voltage signal or a packet sent over a controller area network (CAN) when a computing device detects motion. The external hardware may then use the signals to centrally synchronize the computing devices. However, in this approach complexity and costs may increase from using the external hardware or a custom solution to synchronize systems or sensors in the vehicle.

SUMMARY

In one embodiment, example systems and methods associated with improving the synchronizing of systems in a vehicle without relying on external controls or hardware are disclosed. As previously noted, synchronizing systems in a vehicle using computing devices from different manufacturers can be a difficult task without relying on external hardware. As a result, vehicle manufacturers may encounter increased costs and complexity to integrate and use external hardware to synchronize systems in the vehicle. In the case of automated vehicles, the external hardware may increase processing delays that impact safety. However, in one embodiment, a disclosed approach uses a synchronization system that automatically synchronizes computing devices having sensors according to vehicle movement without relying on an external control. In particular, a computing device may maintain timestamps associated with a reading of sensor data in a buffer. The system may detect the movement of a stopped vehicle or after a synchronization request according to the buffered information that identifies the same movement for synchronization using timestamp correspondences of data. In one approach, the system may control automated driving according to the synchronization of the computing devices until a stop when a subsequent synchronization can occur. In this way, the synchronization system synchronizes sensors using internal and existing data of the computing devices instead of an external control thereby reducing complexity and costs.

In one embodiment, a synchronization system for improving the synchronizing of systems in a vehicle without relying on external controls or hardware is disclosed. The synchronization system includes a memory communicably coupled to a processor. The memory stores a synchronization module including instructions that when executed by a processor cause the processor to detect a stop of a vehicle according to data acquired from two or more sensors. The synchronization module also includes instructions to identify motion from the stop according to the data and corresponding timestamps from the two or more sensors, wherein the data and the corresponding timestamps are internal to the two or more sensors. The synchronization module also includes instructions to synchronize the two or more sensors according to the corresponding timestamps. The synchronization module also includes instructions to control the motion of the vehicle using the two or more sensors.

In one embodiment, a non-transitory computer-readable medium for improving the synchronizing of systems in a vehicle without relying on external controls or hardware and including instructions that when executed by a processor cause the processor to perform one or more functions is disclosed. The instructions include instructions to detect a stop of a vehicle according to data acquired from two or more sensors. The instructions also include instructions to identify motion from the stop according to the data and corresponding timestamps from the two or more sensors, wherein the data and the corresponding timestamps are internal to the two or more sensors. The instructions also include instructions to synchronize the two or more sensors according to the corresponding timestamps. The instructions also include instructions to control the motion of the vehicle using the two or more sensors.

In one embodiment, a method for improving the synchronizing of systems in a vehicle without relying on external controls or hardware is disclosed. In one embodiment, the method includes detecting a stop of a vehicle according to data acquired from two or more sensors. The method also includes identifying motion from the stop according to the data and corresponding timestamps from the two or more sensors, wherein the data and the corresponding timestamps are internal to the two or more sensors. The method also includes synchronizing the two or more sensors according to the corresponding timestamps. The method also includes controlling the motion of the vehicle using the two or more sensors.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving the synchronizing of sensors in a vehicle using timestamps without relying on external controls are disclosed. As previously noted, vehicles may use external controls or hardware to synchronize sensors since systems may originate from different manufacturers. As such, each of these systems may utilize incompatible protocols and interfaces for synchronizing causing difficulties for reliably operating a vehicle. For example, automated vehicles rely on synchronized systems for motion planning, collision avoidance, and so on. Accordingly, in one embodiment, a synchronization system resolves difficulties to synchronize sensors from different manufacturers by leveraging data and corresponding timestamps that are related from two or more sensors in the vehicle. The synchronization system may do so using existing hardware, thereby avoiding changes to vehicle designs or production.

Moreover, the synchronization system may initiate when a vehicle loses synchronization, such as during a stop. In order to regain synchronization, the synchronization system may identify motion using acquired data and corresponding timestamps from multiple sensors. For example, one sensor may be a global positioning system (GPS) device that detects the movement of the vehicle. The GPS sensor may associate position data from the movement with a timestamp. Similarly, another sensor may be a camera that detects the same movement from image data. The camera may associate the image data from the movement with another timestamp. The synchronization system may then synchronize sensors when the timestamps correspond and the GPS and image data relate by using the instance of motion as a synchronization point. Furthermore, synchronization may be maintained and used to control the vehicle until another stop where the synchronization system repeats the process. In this way, the synchronization system synchronizes sensors using existing hardware without relying on external controls, thereby reducing complexity and costs for a vehicle.

Figure 1:
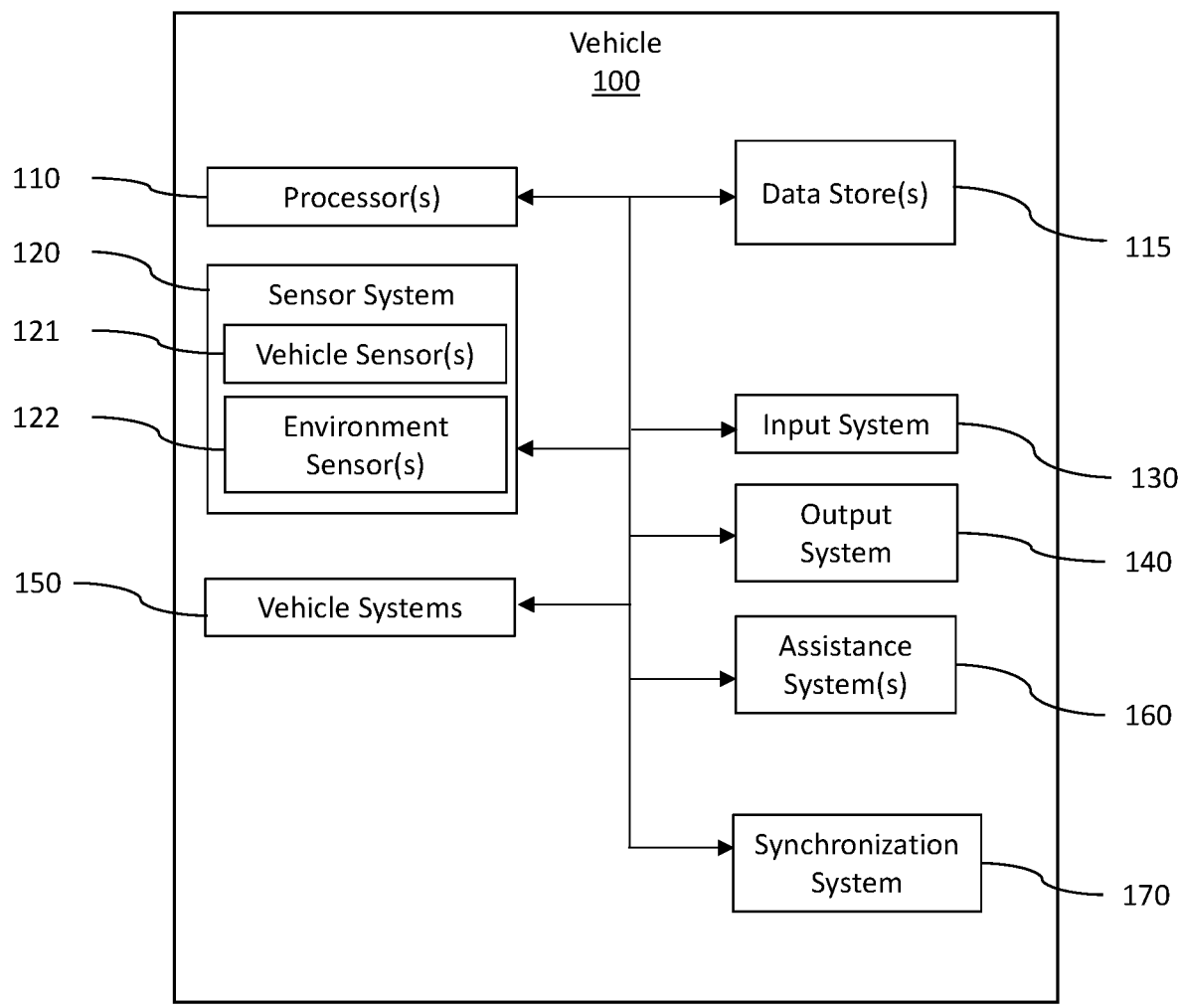
FIG. 1 illustrates one embodiment of a vehicle in which example systems and methods disclosed herein may operate.

Referring now to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. For example, in some implementations, the synchronization system 170 may be implemented in a different device, such as a smartphone, camera, security-monitoring camera, or another device that is equipped with systems for performing the noted functions.

In any case, the vehicle 100 also includes various elements. It will be understood that, in various embodiments, the vehicle 100 may not have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. A description of many of the elements in FIG. 1 will be provided after the discussion of FIGS. 2-5 for purposes of the brevity of this description. Additionally, it will be appreciated that for simplicity and clarity of illustration, where appropriate, reference numerals have been repeated among the different figures to indicate corresponding, analogous, or similar elements. Furthermore, it should be understood that the embodiments described herein may be practiced using various combinations of the described elements.

In either case, the vehicle 100 includes the synchronization system 170 that functions to synchronize sensors using data and corresponding timestamps without relying on an external control or hardware. The sensors to synchronize may be the vehicle sensors 121 or the environment sensors 122. Moreover, while depicted as a standalone component, in one or more embodiments, the synchronization system 170 is integrated with the assistance system(s) 160, or another similar system of the vehicle 100 as a sub-component thereof. The noted functions and methods will become more apparent with a further discussion of the figures.

Figure 2:
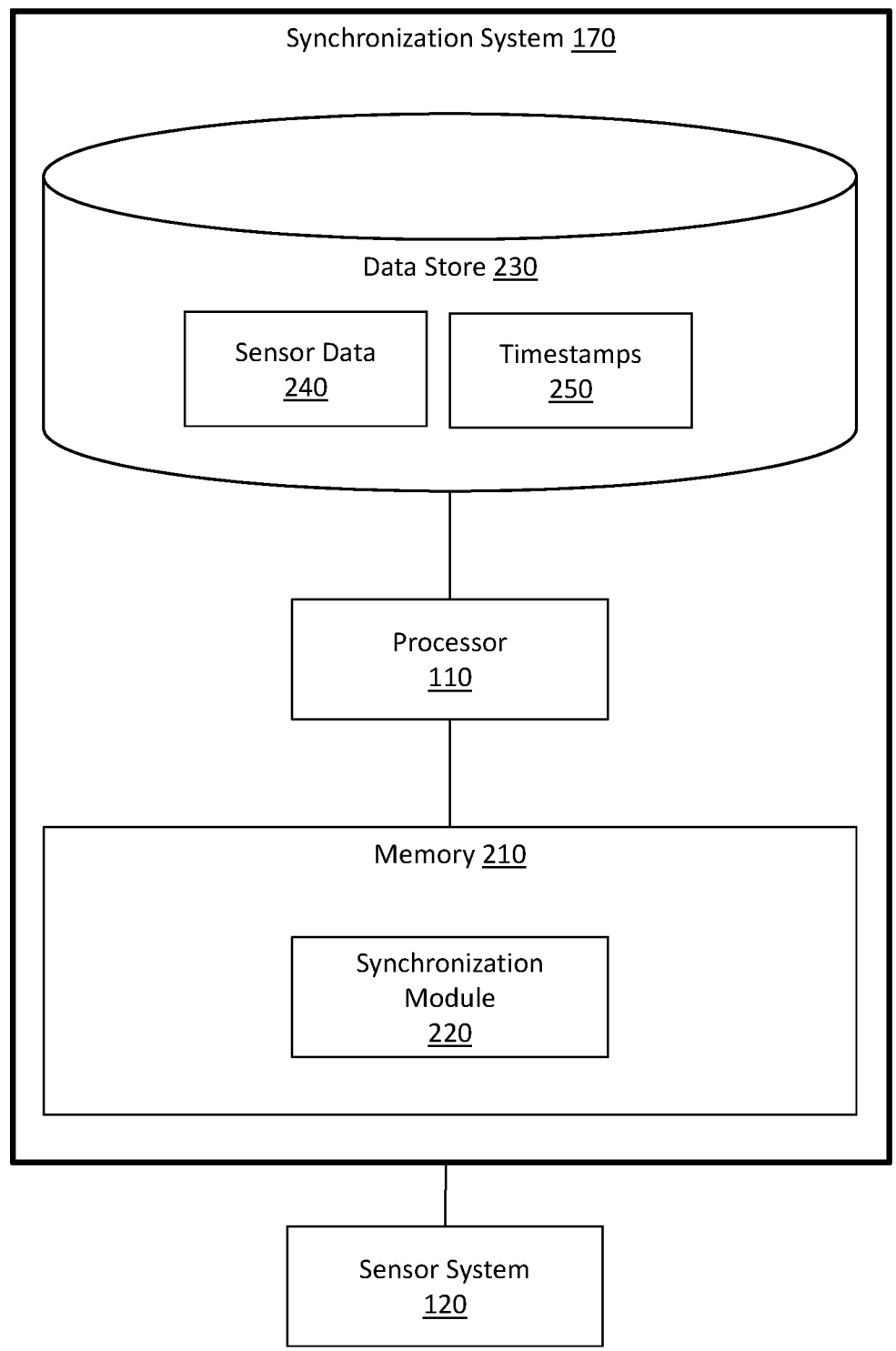
FIG. 2 illustrates one embodiment of a synchronization system that is associated with improving the synchronizing of sensors in a vehicle without relying on an external control.

With reference now to FIG. 2, one embodiment of the synchronization system 170 is further illustrated. As shown, the synchronization system 170 includes a processor(s) 110. Accordingly, the processor(s) 110 may be a part of the synchronization system 170, or the synchronization system 170 may access the processor(s) 110 through a controller area network (CAN), data bus, or another communication pathway. In one or more embodiments, the processor(s) 110 is an application-specific integrated circuit that is configured to implement functions associated with a synchronization module 220, that will be further described below. More generally, in one or more aspects, the processor(s) 110 is an electronic processor such as a microprocessor that is capable of performing various functions as described herein when executing encoded functions associated with the synchronization system 170.

In one embodiment, the synchronization system 170 includes a memory 210 that stores the synchronization module 220. The memory 210 is a random-access memory (RAM), read-only memory (ROM), a hard disk drive, a flash memory, or other suitable memory for storing the synchronization module 220. The synchronization module 220 is, for example, computer-readable instructions that, when executed by the processor(s) 110, cause the processor(s) 110 to perform the various functions disclosed herein. While, in one or more embodiments, the synchronization module 220 exists as instructions embodied in the memory 210, in further aspects, the synchronization module 220 includes hardware, such as processing components (e.g., controllers), circuits, etc. for independently performing one or more of the noted functions. In any case, it should be appreciated that the instructions of the synchronization module 220 impart structure to the synchronization system 170 through correlations of opcodes with the processor(s) 110 and memory in which the synchronization system 170 stores the instructions.

Furthermore, in one embodiment, the synchronization system 170 includes a data store 230. The data store 230 is, in one embodiment, an electronically-based data structure for storing information. In one approach, the data store 230 is a database that is stored in the memory 210 or another suitable storage medium, and that is configured with routines that can be executed by the processor(s) 110 for analyzing stored data, providing stored data, organizing stored data, and so on. In any case, in one embodiment, the data store 230 stores data used by the synchronization module 220 in executing various functions. In one embodiment, the data store 230 includes sensor data 240 and timestamps 250 along with, for example, other information that is used or acquired by the synchronization module 220. In one approach, the sensor data 240 and the timestamps 250 may be internal to a sensor as part of a controller or subsystem that integrates into the vehicle 100 for driving and maneuvering operations.

Moreover, the sensor data 240 may be CAN data, GPS data (e.g., latitude and longitude), images, steering angles, speed, light detection and ranging (LIDAR) data, and so on. As explained below, a reading or instance of the sensor data 240 may be associated with one or a range of the timestamps 250. The synchronization system 170 may utilize the sensor data 240 and the timestamps 250 when the vehicle 100 is to synchronize the sensor system 120 to find commonality and determine a synchronization point. For example, a synchronization point may be a time instance or time reference for the vehicle sensors 121 or the environment sensors 122 to relate data or measurements.

Accordingly, the synchronization module 220 generally includes instructions that function to control the processor(s) 110 to acquire data inputs from one or more sensors (e.g., the environment sensors 122) of the vehicle 100 that form the sensor data 240. The sensor data 240 may include information that embodies observation, such as for a visual odometry (VO) component for the synchronization system 170 to detect motion and synchronize sensors of the sensor system 120 without relying on external controls or hardware. For example, the VO component may process the position and orientation of the vehicle 100 by analyzing camera images to extract features or pixel intensity.

While the synchronization module 220 is discussed as controlling the various sensors to provide the sensor data 240, in one or more embodiments, the synchronization module 220 can employ other techniques to acquire the sensor data 240 that are either active or passive. For example, the synchronization module 220 may passively sniff the sensor data 240 from a stream of electronic information provided by the various sensors to further components within the vehicle 100. Moreover, the synchronization module 220 can undertake various approaches to fuse data from multiple sensors when providing the sensor data 240 to the synchronization system 170 to detect motion and synchronize sensors of the sensor system 120 without relying on external controls or hardware. For example, the fused or combined sensor data 240 may be utilized to generate a map used by the vehicle for navigation or control.

Figure 3:
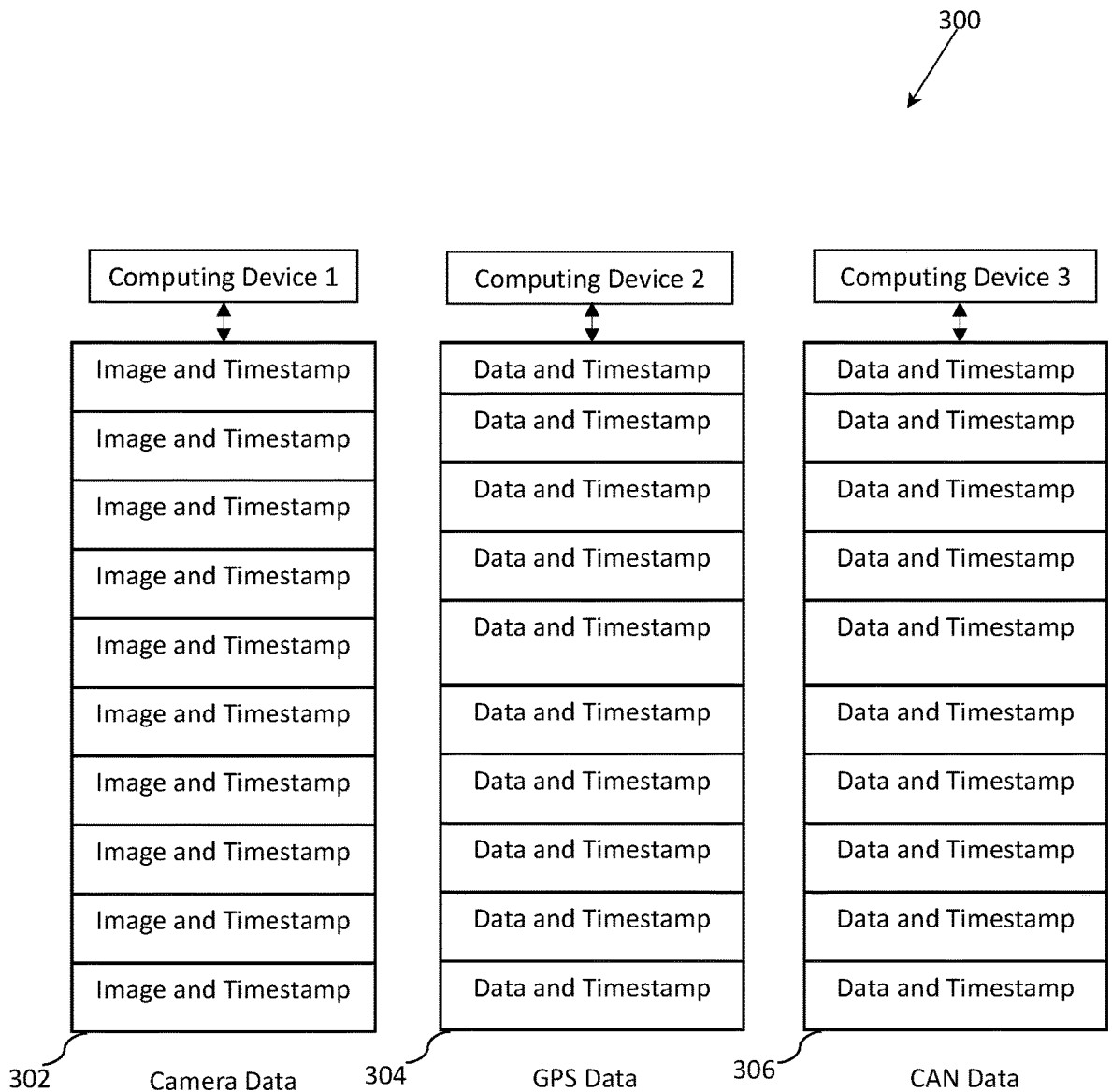
FIG. 3 illustrates one embodiment of a synchronization system using data and corresponding timestamps from multiple sensors to synchronize sensors in a vehicle.

As an explanation of the general premise of a synchronization system using data and corresponding timestamps from multiple sensors to synchronize sensors in a vehicle, FIG. 3 will now be described. In the system 300, the vehicle 100 may include buffer 302 having camera data as part of computing device 1. In one approach, the buffer 302 may be a fixed-sized, circular buffer where data rotates from each end as additional is acquired by the sensor system 120. Similarly, the buffer 304 may include GPS data as part of computing device 2 and the buffer 306 may include CAN data as part of computing device 3. The computing devices 1-3 may be hardware, controllers, subsystems, and so on of the sensor system 120 or vehicle systems 150. Furthermore, the vehicle 100 may have any number of the computing devices 1-3 according to a model, build, trim levels, and so on.

Regarding the computing devices 1-3, separate data readings, instances, or points of buffers 302, 304, or 306 may be associated with a timestamp or a range of timestamps, such as those of timestamps 250. In one approach, the computing devices 1-3 may share an interface or common bus. The synchronization system 170 may initiate a process to synchronize the computing devices 1-3 when required, needed, periodically, and so on. For example, the computing devices 1-3 may lose synchronization during or at a stop due to a lack of certain data or stale data. As such, the synchronization module 220 may monitor the buffers 302, 304, or 306 for common motion in the data to regain synchronization. In one approach, the synchronization module 220 may monitor the buffers 302 and 304 for changes in image and position data, respectively. For instance, changes in features of instances or frames of the image data may reliably identify or indicate the motion of the vehicle 100 when combined with the position data. Similarly, changes in longitude and latitude of the GPS data that the synchronization module 220 detects may reliably identify or indicate the motion of the vehicle 100 when combined with the image data. Accordingly, the synchronization module 220 may associate or relate a correspondence of the timestamps according to the image and GPS data to utilize as a synchronization point for the sensor system 120.

Still referring to using image data, the synchronization module 220 may use a VO component to identify or determine the motion of the vehicle 100 and locate a synchronization point. In one approach, the synchronization module 220 may use the VO component to calculate an amount of rotation and translation of the vehicle 100 by tracking features over time of image data associated with a scene proximate to the vehicle 100. For the VO component, the synchronization module 220 may determine the position and orientation of the vehicle 100 by analyzing camera images to extract features or pixel intensity. Accordingly, the synchronization module 220 may use data from the calculation, position data in the buffer 304, the speed data of the vehicle 100 from the buffer 306 to identify or indicate the motion of the vehicle 100 to find corresponding timestamps. For example, the timestamps may correspond or relate when the synchronization system 170 determines that the degree or values of the buffered data changed and agrees with the relative amount moved from the VO data. Thus, the synchronization system 170 may use the corresponding timestamps as a synchronization point for the computing devices 1-3 or the sensor system 120 without relying on external controls, thereby reducing complexity and costs.

Furthermore, the system 300 may adapt synchronizing using data and related timestamp correspondence according to the vehicle 100 using an automated driving system (ADS) in offline or online mode. In the offline mode, the ADS may use a prediction model for observations in an open-loop by relying on data, such as from the environment sensors 122, generated substantially independently of the prediction model. The output of the prediction model may be evaluated for prediction errors between expected and actual outputs of the model to determine prediction performance related to motion planning, semantic segmentation of a vehicle environment, and so on. In online testing, the ADS may operate a closed-loop where predictions from the prediction model are used to evaluate an environment of the vehicle 100. As such, the model may receive observations associated with the environment, and outputs are directly fed back into the environment for motion planning, semantic segmentation of the vehicle environment, and so on. Here, the system 300 may monitor for corresponding timestamps as a synchronization point for the computing devices 1-3 or the sensor system 120 in offline mode without changes to the camera data from buffer 302 or the CAN data in buffer 306. In online mode, the system 300 may use information related to prediction data, such as a point cloud, as a triggering event to synchronize by detecting the motion of the vehicle 100. In this way, the vehicle 100 can be synchronized without the need for external controls or hardware.

Figure 4:
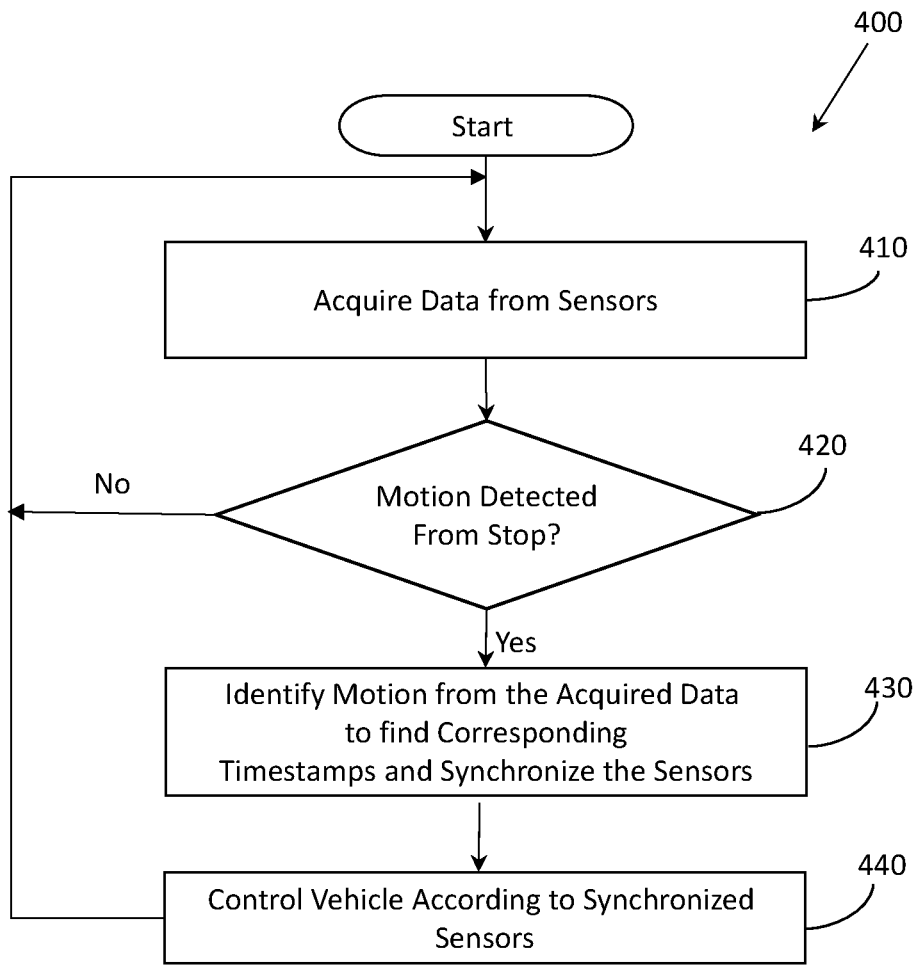
FIG. 4 illustrates one embodiment of a method to synchronize sensors of a vehicle using data and corresponding timestamps to identify motion.

Turning to FIG. 4, additional aspects of improving synchronizing for sensors of a vehicle without the need for external controls or hardware will be discussed. In FIG. 4, one embodiment of a method 400 that synchronizes sensors of a vehicle using data and corresponding timestamps from multiple sensors to identify motion is illustrated. Method 400 will be discussed from the perspective of the synchronization system 170 of FIG. 1. While method 400 is discussed in combination with the synchronization system 170, it should be appreciated that the method 400 is not limited to being implemented within the synchronization system 170 but is instead one example of a system that may implement the method 400. Furthermore, in various implementations, the method 400 may use position data from the buffer 304 and the speed data from the buffer 306 to identify or indicate the motion of the vehicle 100 to find corresponding timestamps and a synchronization point to synchronize the sensors of a vehicle.

At 410, the vehicle 100 acquires data from the sensors of the vehicle sensors 121 or the environment sensors 122. In one or more arrangements, the vehicle sensors 121 can be configured to detect and/or sense position and orientation changes of the vehicle 100, such as, for example, based on inertial acceleration. In one or more arrangements, the vehicle sensors 121 can include one or more accelerometers, one or more gyroscopes, an inertial measurement unit (IMU), a dead-reckoning system, a global navigation satellite system (GNSS), a GPS, a navigation system, and/or other suitable sensors.

Regarding the environment sensors 122, one or more of the environment sensors 122 can be configured to detect and/or sense obstacles in at least a portion of the external environment of the vehicle 100 and/or information/data about such obstacles. Such obstacles may be stationary objects and/or dynamic objects. The one or more environment sensors 122 can also be configured to detect, and/or sense other things in the external environment of the vehicle 100, such as, for example, lane markers, signs, traffic lights, traffic signs, lane lines, crosswalks, curbs proximate the vehicle 100, off-road objects, etc. Furthermore, the vehicle 100 may store the data acquired from the vehicle sensors 121 or the environment sensors 122 in buffers 302, 304, or 306 along with corresponding timestamps.

At 420, the synchronization module 220 detects motion subsequent to a stop of the vehicle 100. The motion may be detected through the vehicle sensors 121 that senses the position and orientation changes of the vehicle 100, such as, for example, based on inertial acceleration. For example, the synchronization module 220 may detect motion using data from a speedometer or tire rotation from a vehicle sensor. In one approach, the synchronization module 220 may use a VO component to determine the position and orientation of the vehicle 100 by analyzing camera images to extract features or pixel intensity to detect motion.

At 430, the synchronization module 220 identifies motion from the acquired data to find corresponding timestamps and synchronize the sensors. In particular, the synchronization module 220 may utilize the timestamps 250 when the vehicle 100 loses synchronization of the sensor system 120 to find commonality and determine a synchronization point. For example, a synchronization point may be a time instance or time reference for the vehicle sensors 121 or the environment sensors 122 to relate data or measurements.

Regarding correspondence of timestamps, as explained above in FIG. 3, a data reading, instance, or point of the buffers 302, 304, or 306 may be associated with a timestamp, such as those of timestamps 250. For this case, the synchronization module 220 may initiate a process to synchronize the computing devices 1-3 due to lost synchronization of sensors from stopping the vehicle 100. Accordingly, the synchronization module 220 may monitor the buffers 302, 304, or 306 for common motion in the data. For instance, the synchronization module 220 may monitor the buffers 302 and 304 for changes in image and position data, respectively. For image data, changes in features of an instance or frame may reliably identify or indicate the motion of the vehicle 100 when combined with the position data. Similarly, changes in longitude and latitude of the GPS data that the synchronization module 220 identifies may reliably identify or indicate the motion of the vehicle 100 when combined with the image data. Accordingly, the synchronization module 220 may associate a correspondence of the timestamps according to the image and GPS data to utilize as a synchronization point for the sensor system 120.

Still referring to images, the synchronization module 220 may use a VO component to identify or determine the motion of the vehicle 100. As previously explained, the synchronization module 220 may use VO to calculate an amount of rotation and translation of the vehicle 100 by tracking features over time of image data associated with a scene proximate to the vehicle 100. Accordingly, the synchronization module 220 may use data from the calculation, position data from the buffer 304, or speed data of the vehicle 100 from the buffer 306 to identify or indicate the motion of the vehicle 100 and find corresponding timestamps. For example, the timestamps may correspond when the synchronization system 170 determines that the degree or values of the buffered data changed and agrees with the relative amount moved from the VO data. Thus, at 430 the synchronization system 170 may use the corresponding timestamps and detected relations between data to reliably find a synchronization point for the computing devices 1-3 without an external control.

At 440, the vehicle 100 uses the synchronized sensors for control. In various embodiments, control of the vehicle 100 may include motion planning, collision avoidance, semantic segmentation, automated driving, and so on. For example, the vehicle 100 can combine data from a VO component with the position data in the buffer 304 to accurately and reliably, in view of the synchronization, navigate the vehicle 100 on a road during automated driving. As another example, the vehicle 100 may combine camera data in the buffer 302 and position data in the buffer 304 to update information on a heads-up display (HUD). Furthermore, the vehicle 100 while in motion continues to acquire data from the vehicle sensors 121 and the environment sensors 122 until synchronization is lost.

Figure 5:
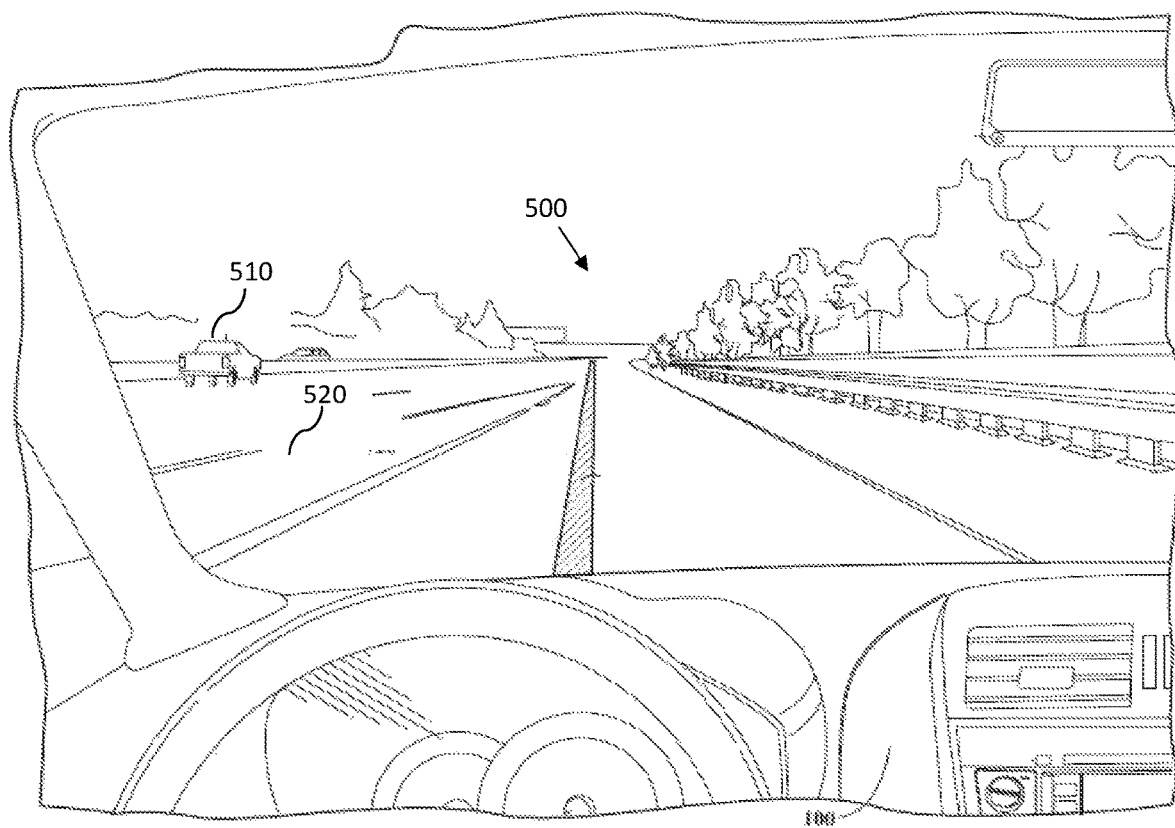
FIG. 5 illustrates a vehicle within a vehicle driving environment and using a synchronization system that synchronizes sensors according to data and corresponding timestamps without relying on an external control.

Concerning FIG. 5, a vehicle within a vehicle driving environment and using a synchronization system that synchronizes sensors according to data and corresponding timestamps without relying on an external control is illustrated. In FIG. 5, the driving environment 500 may include the vehicle 100 traveling on the road 520 with another vehicle 510. In various embodiments, for automated driving the synchronization system 170 for the vehicle 100 may synchronize the vehicle sensors 121 and the environment sensors 122 using sensor data and timestamps due to lost synchronization. In particular, the synchronization system 170 may identify a synchronization point once the vehicle 100 moves from a stop using timestamps that correspond when the synchronization system 170 determines that the degree or values of the buffered data changed and agrees with the relative amount moved from VO data. In this way, the synchronization system 170 may synchronize sensors of the vehicle 100 without the need for external controls or hardware, thereby reducing complexity and cost.

Additionally, it should be appreciated that the synchronization system 170 from FIG. 1 can be configured in various arrangements with separate integrated circuits and/or electronic chips. In such embodiments, the synchronization module 220 is embodied as a separate integrated circuit. The circuits are connected via connection paths to provide for communicating signals between the separate circuits. Of course, while separate integrated circuits are discussed, in various embodiments, the circuits may be integrated into a common integrated circuit and/or integrated circuit board. Additionally, the integrated circuits may be combined into fewer integrated circuits or divided into more integrated circuits. In another embodiment, the synchronization module 220 may be combined into a separate application-specific integrated circuit. In further embodiments, portions of the functionality associated with the synchronization module 220 may be embodied as firmware executable by a processor and stored in a non-transitory memory. In still further embodiments, the synchronization module 220 is integrated as hardware components of the processors 110.

In another embodiment, the described methods and/or their equivalents may be implemented with computer-executable instructions. Thus, in one embodiment, a non-transitory computer-readable medium is configured with stored computer-executable instructions that, when executed by a machine (e.g., processor, computer, and so on), cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than the illustrated blocks may be used to implement an example methodology. Blocks may be combined or separated into multiple components. Furthermore, additional and/or alternative methodologies can employ additional blocks that are not illustrated.

FIG. 1 will now be discussed in full detail as an example environment within which the systems and methods disclosed herein may operate. In some instances, the vehicle 100 is configured to switch selectively between an automated or autonomous mode, one or more semi-autonomous operational modes, and/or a manual mode. Such switching can be implemented in a suitable manner. "Manual mode" means that all of or a majority of the navigation and/or maneuvering of the vehicle is performed according to inputs received from a user (e.g., human drive or operator).

In one or more embodiments, the vehicle 100 is an automated or autonomous vehicle. As used herein, "automated vehicle" or "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is fully automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as assisted by the synchronization system 170 to ensure the vehicle 100 remains within defined state constraints.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 (e.g., data store 230) for storing one or more types of data. The data store(s) 115 can include volatile and/or non-volatile memory. Examples of suitable data stores 115 include RAM, flash memory, ROM, Programmable ROM (PROM), Erasable Programmable ROM (EPROM), Electrically-Erasable Programmable ROM (EEPROM), registers, magnetic disks, optical disks, hard drives, or any other suitable storage medium, or any combination thereof. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data. The map data can include maps of one or more geographic areas. In some instances, the map data can include information (e.g., metadata, labels, etc.) on roads, traffic control devices, road markings, structures, features, and/or landmarks in the one or more geographic areas. In some instances, the map data can include aerial/satellite views. In some instances, the map data can include ground views of an area, including 360-degree ground views. The map data can include measurements, dimensions, distances, and/or information for one or more items included in the map data and/or relative to other items included in the map data. The map data can include a digital map with information about road geometry. The map data can further include feature-based map data such as information about relative locations of buildings, curbs, poles, etc. In one or more arrangements, the map data can include one or more terrain maps. In one or more arrangements, the map data can include one or more static obstacle maps. The static obstacle map(s) can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, or hills. The static obstacles can be objects that extend above ground level.

The one or more data stores 115 can include sensor data (e.g., sensor data 240). In this context, "sensor data" means any information from the sensors that the vehicle 100 is equipped with, including the capabilities and other information about such sensors.

As noted above, the vehicle 100 can include the sensor system 120. The sensor system 120 can include one or more sensors. "Sensor" means any device, component, and/or system that can detect, perceive, and/or sense something. The one or more sensors can be configured to operate in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself or interior compartments of the vehicle 100. In one or more arrangements, the vehicle sensor(s) 121 can be configured to detect and/or sense position and orientation changes of the vehicle 100, such as, for example, based on inertial acceleration. In one or more arrangements, the vehicle sensor(s) 121 can include one or more accelerometers, one or more gyroscopes, an IMU, a dead-reckoning system, a GNSS, a GPS, a navigation system, and/or other suitable sensors. The vehicle sensor(s) 121 can be configured to detect and/or sense one or more characteristics of the vehicle 100. In one or more arrangements, the vehicle sensor(s) 121 can include a speedometer to determine a current speed of the vehicle 100. Moreover, the sensor system 121 can include sensors throughout a passenger compartment such as pressure/weight sensors in seats, seatbelt sensors, camera(s), and so on.

Alternatively, or in addition, the sensor system 120 can include one or more environment sensors 122 configured to acquire and/or sense driving environment data. "Driving environment data" includes data or information about the external environment in which an autonomous vehicle is located or one or more portions thereof. For example, the one or more environment sensors 122 can be configured to detect and/or sense obstacles in at least a portion of the external environment of the vehicle 100 and/or information/data about such obstacles. Such obstacles may be stationary objects and/or dynamic objects. The one or more environment sensors 122 can be configured to detect, and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described. As an example, in one or more arrangements, the sensor system 120 can include one or more radar sensors, one or more LIDAR sensors, one or more sonar sensors, and/or one or more cameras. In one or more arrangements, the one or more cameras can be high dynamic range (HDR) cameras or infrared (IR) cameras.

The vehicle 100 can include an input system 130. An "input system" includes, without limitation, devices, components, systems, elements, or arrangements or groups thereof that enable information/data to be entered into a machine. The input system 130 can receive an input from a vehicle passenger (e.g., an operator or a passenger). The vehicle 100 can include an output system 140. An "output system" includes any device, component, or arrangement or groups thereof that enable information/data to be presented to a vehicle passenger (e.g., a person, a vehicle passenger, etc.).

The vehicle 100 can include one or more vehicle systems 150. Various examples of the one or more vehicle systems 150 are shown in FIG. 1; however, the vehicle 100 can include a different combination of systems than illustrated in the provided example. In one example, the vehicle 100 can include a propulsion system, a braking system, a steering system, a throttle system, a transmission system, a signaling system, a navigation system, and so on. The noted systems can separately or in combination include one or more devices, components, and/or a combination thereof.

By way of example, the navigation system can include one or more devices, applications, and/or combinations thereof configured to determine the geographic location of the vehicle 100 and/or to determine a travel route for the vehicle 100. The navigation system can include one or more mapping applications to determine a travel route for the vehicle 100. The navigation system can include a GPS, a local positioning system or a geolocation system.

The processor(s) 110, the synchronization system 170, and/or the assistance system(s) 160 can be operatively connected to communicate with the various vehicle systems 150 and/or individual components thereof. For example, returning to FIG. 1, the processor(s) 110 and/or the assistance system(s) 160 can be in communication to send and/or receive information from the various vehicle systems 150 to control the movement, speed, maneuvering, heading, direction, etc. of the vehicle 100. The processor(s) 110, the synchronization system 170, and/or the assistance system(s) 160 may control some or all of these vehicle systems 150 and, thus, may be partially or fully autonomous.

The processor(s) 110, the synchronization system 170, and/or the assistance system(s) 160 can be operatively connected to communicate with the various vehicle systems 150 and/or individual components thereof. For example, returning to FIG. 1, the processor(s) 110, the synchronization system 170, and/or the assistance system(s) 160 can be in communication to send and/or receive information from the various vehicle systems 150 to control the movement, speed, maneuvering, heading, direction, etc. of the vehicle 100. The processor(s) 110, the synchronization system 170, and/or the assistance system(s) 160 may control some or all of these vehicle systems 150.

The processor(s) 110, the synchronization system 170, and/or the assistance system(s) 160 may be operable to control the navigation and/or maneuvering of the vehicle 100 by controlling one or more of the vehicle systems 150 and/or components thereof. For instance, when operating in an autonomous mode, the processor(s) 110, the synchronization system 170, and/or the assistance system(s) 160 can control the direction and/or speed of the vehicle 100. The processor(s) 110, the synchronization system 170, and/or the assistance system(s) 160 can cause the vehicle 100 to accelerate (e.g., by increasing the supply of energy provided to the engine), decelerate (e.g., by decreasing the supply of energy to the engine and/or by applying brakes), and/or change direction (e.g., by turning the front two wheels).

Moreover, the synchronization system 170 and/or the assistance system(s) 160 can function to perform various driving-related tasks. The vehicle 100 can include one or more actuators. The actuators can be any element or combination of elements operable to modify, adjust and/or alter one or more of the vehicle systems or components thereof responsive to receiving signals or other inputs from the processor(s) 110 and/or the assistance system(s) 160. Any suitable actuator can be used. For instance, the one or more actuators can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include the assistance system(s) 160. The assistance system(s) 160 can be configured to receive data from the sensor system 120 and/or any other type of system capable of capturing information relating to the vehicle 100 and/or the external environment of the vehicle 100. In one or more arrangements, the assistance system(s) 160 can use such data to generate one or more driving scene models. The assistance system(s) 160 can determine the position and velocity of the vehicle 100. The assistance system(s) 160 can determine the location of obstacles, or other environmental features, including traffic signs, trees, shrubs, neighboring vehicles, pedestrians, and so on.

The assistance system(s) 160 can be configured to receive, and/or determine location information for obstacles within the external environment of the vehicle 100 for use by the processors 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The assistance system(s) 160, either independently or in combination with the synchronization system 170, can be configured to determine travel path(s), current autonomous driving maneuvers for the vehicle 100, future autonomous driving maneuvers, and/or modifications to current autonomous driving maneuvers based on data acquired by the sensor system 120, driving scene models, and/or data from any other suitable source such as determinations from the sensor data 240. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The assistance system(s) 160 can be configured to implement determined driving maneuvers. The assistance system(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The assistance system(s) 160 can be configured to execute various vehicle functions and/or to transmit data to, receive data from, interact with, and/or control the vehicle 100 or one or more systems thereof (e.g., one or more of vehicle systems 150).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, another magnetic medium, an application-specific integrated circuit (ASIC), a CD, another optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term and that may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that, when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A synchronization system, comprising:
 a memory communicably coupled to a processor and storing:
 a synchronization module including instructions that when executed by the processor cause the processor to:

detect a stop of a vehicle according to buffered data acquired from two or more sensors that are each associated with computing devices;

identify motion from the stop according to the buffered data and corresponding timestamps for the buffered data from the two or more sensors, wherein the buffered data and the corresponding timestamps are generated internally to the two or more sensors;

synchronize the two or more sensors according to the corresponding timestamps, a position from visual odometry (VO) data, and changed degrees of the buffered data without external controls from the computing devices; and control the motion of the vehicle using the two or more sensors.

2. The synchronization system of claim 1, wherein the synchronization module includes instructions to synchronize the two or more sensors further including instructions to determine a synchronization point by comparing differences in degree from the buffered data and the corresponding timestamps between the two or more sensors.

3. The synchronization system of claim 1, wherein the synchronization module includes instructions to identify the motion from the stop further including instructions to acquire location data from a global positioning system of the vehicle at the corresponding timestamps for the synchronization.

4. The synchronization system of claim 3, wherein the synchronization module further includes instructions to:
track images associated with the vehicle and determine rotation and translational motion for the VO data using pixel intensity of the images; and
update the corresponding timestamps by comparing the changed degrees to relative movement of the VO data and the pixel intensity.

5. The synchronization system of claim 1, wherein the synchronization module includes instructions to identify the motion from the stop further including instructions to acquire controller area network (CAN) data and position from a global positioning system for relating with the corresponding timestamps to indicate synchronization.

6. The synchronization system of claim 5, wherein the CAN data indicates speed and a steering wheel angle of the vehicle.

7. The synchronization system of claim 1, wherein the synchronization module further includes instructions to detect a subsequent stop from the stop of the vehicle operating with automated driving according to the two or more sensors for synchronization from acceleration after the subsequent stop.

8. The synchronization system of claim 1, wherein the synchronization module includes instructions to synchronize the two or more sensors further including instructions to determine a synchronization point independent of a central controller.

9. A non-transitory computer-readable medium comprising:
instructions that when executed by a processor cause the processor to:
detect a stop of a vehicle according to buffered data acquired from two or more sensors that are each associated with computing devices;
identify motion from the stop according to the buffered data and corresponding timestamps for the buffered data from the two or more sensors, wherein the buffered data and the corresponding timestamps are generated internally to the two or more sensors;
synchronize the two or more sensors according to the corresponding timestamps, a position from visual odometry (VO) data, and changed degrees of the buffered data without external controls from the computing devices; and
control the motion of the vehicle using the two or more sensors.

10. The non-transitory computer-readable medium of claim 9, wherein the instructions to synchronize the two or more sensors further include instructions to determine a synchronization point by comparing differences in degree from the buffered data and the corresponding timestamps between the two or more sensors.

11. The non-transitory computer-readable medium of claim 9, wherein the instructions to identify the motion from the stop further include instructions to acquire location data from a global positioning system of the vehicle at the corresponding timestamps for the synchronization.

12. The non-transitory computer-readable medium of claim 11, further including instructions that when executed by the processor cause the processor to:
track images associated with the vehicle and determine rotation and translational motion for the VO data using pixel intensity of the images; and
update the corresponding timestamps by comparing the changed degrees to relative movement of the VO data and the pixel intensity.

13. A method, comprising:
detecting a stop of a vehicle according to buffered data acquired from two or more sensors that are each associated with computing devices;
identifying motion from the stop according to the buffered data and corresponding timestamps for the buffered data from the two or more sensors, wherein the buffered data and the corresponding timestamps are generated internally to the two or more sensors;
synchronizing the two or more sensors according to the corresponding timestamps a position from visual odometry (VO) data, and changed degrees of the buffered data without external controls from the computing devices; and
controlling the motion of the vehicle using the two or more sensors.

14. The method of claim 13, wherein synchronizing the two or more sensors includes determining a synchronization point by comparing differences in degree from the buffered data and the corresponding timestamps between the two or more sensors.

15. The method of claim 13, wherein identifying the motion from the stop includes acquiring location data from a global positioning system of the vehicle at the corresponding timestamps for the synchronization.

16. The method of claim 15, further comprising:
tracking images associated with the vehicle and determining rotation and translational motion for the VO data using pixel intensity of the images; and
updating the corresponding timestamps by comparing the changed degrees to relative movement of the VO data and the pixel intensity.

17. The method of claim 13, wherein identifying the motion from the stop includes acquiring controller area network (CAN) data and position from a global positioning system for relating with the corresponding timestamps to indicate synchronization.

18. The method of claim 17, wherein the CAN data indicates speed and a steering wheel angle of the vehicle.

19. The method of claim 13, further comprising:
  detecting a subsequent stop from the stop of the vehicle operating with automated driving according to the two or more sensors for synchronization from acceleration after the subsequent stop.

20. The method of claim 13, wherein synchronizing the two or more sensors includes determining a synchronization point independent of a central controller.

* * * * *